United States Patent
Sui et al.

(10) Patent No.: US 11,296,825 B2
(45) Date of Patent: Apr. 5, 2022

(54) CONFIGURATION OF ADDITONAL SYSTEM INFORMATION BLOCK REPETITIONS

(71) Applicant: TELEFONAKTIEBOLAGET LM ERICSSON (PUBL), Stockholm (SE)

(72) Inventors: Yutao Sui, Solna (SE); Emre Yavuz, Stockholm (SE); Andreas Höglund, Solna (SE); Yi-Pin Eric Wang, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 206 days.

(21) Appl. No.: 16/644,246

(22) PCT Filed: Sep. 12, 2018

(86) PCT No.: PCT/SE2018/050917
§ 371 (c)(1),
(2) Date: Mar. 4, 2020

(87) PCT Pub. No.: WO2019/066694
PCT Pub. Date: Apr. 4, 2019

(65) Prior Publication Data
US 2021/0067270 A1 Mar. 4, 2021

Related U.S. Application Data

(60) Provisional application No. 62/565,424, filed on Sep. 29, 2017.

(51) Int. Cl.
*H04L 1/18* (2006.01)
*H04L 1/08* (2006.01)
(Continued)

(52) U.S. Cl.
CPC ............. *H04L 1/08* (2013.01); *H04L 5/0091* (2013.01); *H04W 48/12* (2013.01)

(58) Field of Classification Search
None
See application file for complete search history.

(56) References Cited

U.S. PATENT DOCUMENTS

2009/0316811 A1* 12/2009 Maeda ............... H04W 72/1278
375/260
2016/0149672 A1* 5/2016 Shimezawa ........... H04L 1/1607
370/329
(Continued)

FOREIGN PATENT DOCUMENTS

WO  2015041487 A1  3/2015
WO  2017052459 A1  3/2017

OTHER PUBLICATIONS

International Search Report issued for PCT Application PCT/SE2018/050917 dated Jan. 21, 2019.
(Continued)

*Primary Examiner* — Mujtaba M Chaudry
(74) *Attorney, Agent, or Firm* — Ericsson Inc.

(57) ABSTRACT

Embodiments described herein relate to methods and apparatus for determining which 5 of a plurality of subframes are repetition subframes, wherein repetition subframes are subframes scheduled for use by a base station to transmit a repetition of a system information block. A method comprises receiving a first mapping comprising information designating a subset of the plurality of subframes as invalid subframes; and determining, based on the first mapping and a second mapping, which of the 0 subframes designated as invalid subframes are repetition subframes, wherein the second mapping comprises information designating at least one of the subset of the plurality of subframes as a repetition subframe.

19 Claims, 16 Drawing Sheets

(51) Int. Cl.
*H04L 5/00* (2006.01)
*H04W 48/12* (2009.01)

(56) References Cited

U.S. PATENT DOCUMENTS

2017/0013626 A1* 1/2017 Nan ................. H04L 1/1854
2017/0295601 A1* 10/2017 Kim ................ H04W 72/0406

OTHER PUBLICATIONS

Arvind Chakrapani; Efficient Resource Scheduling for eMTC/NB-IoT Communications in LTE Rel. 13; 2017 IEEE Conference for Standards for Communication and Networking (CSCN), Bridgewater, New Jersey, pp. 1-6.
3GPP TSG RAN WG1 Meeting #84bis; Busan, Korea; Source: Huawei, HiSilicon; Title: Invalid subftames configuratior and handling; (R1-162632)—Apr. 11-15, 2016; pp. 1-3.
3GPP TSG RAN WG1 Meeting #90; Prague, Czech Republic; Source: Huawei, HiSilicon, Neul; Title: On NB-IoT System Information acquisition time reduction; (R1-1714548)—Aug. 21-25, 2017; pp. 1-6.
3GPP TSG RAN WG1 Meeting #88; Athens, Greece ; Source: RAN4; Title: LS to RAN1, RAN2 on eNB-IoT SI acquisition delay; (R1-1701571)—Feb. 13-17, 2017; pp. 1-2.
3GPP TSG RAN Meeting #75; Dubrovnik, Croatia; Source: Huawei, HiSilicon, Neul; Title: New WID on Further NB-IoT enhancements; (R1-170852)—Mar. 6-9, 2017; pp. 1-6.
3GPP TSG RAN WG1 Meeting #90; Prague Czech Republic; Source: LG Electronics; Title: System information acquisition time enhancement in NB-IoT; (R1-1713108)—Aug. 21-25, 2017; pp. 1-11.
3GPP TSG RAN WG1 Meeting #90; Prague Czech Republic; Source: Intel Corporation; Title: System acquisition time reduction for feNB-IoT; (R1-1714121—Aug. 21-25, 2017; pp. 1-4.
3GPP TS 36.211 V14.3.0; 3rd Generation Partnership Project; Technical Specification Group Radio Access Network; Evolved Universal Terrestrial Radio Access (E-UTRA); Physical channels and modulation (Release 14); 650 Route des Lucioles—Sophia Antipolis Valbonne—France; Jun. 2017; pp. 1-195.
3GPP TS 36.331 V14.3.0; 3rd Generation Partnership Project; Technical Specification Group Radio Access Network; Evolved Universal Terrestrial Radio Access (E-UTRA); Radio Resource Control (RRC); Protocol specification (Release 14); 650 Route des Lucioles—Sophia Antipolis Valbonne—France; Jun. 2017; pp. 1-745.
ZTE, "Discussion on system information scheduling", 3GPP TSG-RAN WG2 Meeting#94, R2-164118, Nanjing, China, May 23-27, 2016.
Extended European Search report issued on corresponding application EP 18860389.8 dated Jun. 4, 2021.

* cited by examiner

Fig. 1

| SIB1-NB indicator | | | | | |
|---|---|---|---|---|---|
| 0 | 1 | 2 | 3 | 4 | 5 |
|  |  | X |  |  | X |

Fig. 2

| Index: | Interpretation: |
|---|---|
| 00 | Mapping A |
| 01 | Mapping B |
| 10 | Mapping C |
| 11 | Mapping D |

Fig. 3

| Index: | Value of M: |
|---|---|
| 00 | 2 (every second radio frame) |
| 01 | 3 (every third radio frame) |
| 10 | 4 (every fourth radio frame) |
| 11 | 5 (every fifth radio frame) |

Fig. 4

| The SIB1-NB radio frame | | | |
|---|---|---|---|
| 0 | 1 | 2 | 3 |
|  | x | X |  |

| First Mapping | | | | | | | | | | |
|---|---|---|---|---|---|---|---|---|---|---|
| 0 | 1 | 2 | 3 | 4 | 5 | 6 | 7 | 8 | 9 | |
| | | X | | | | | | X | | |

Fig. 7

| Index: | Second mapping | Third mapping |
|---|---|---|
| 00 | Every $2^{nd}$ invalid subframe | 2 (every second radio frame) |
| 01 | Every $2^{nd}$ invalid subframe | 4 (every fourth radio frame) |
| 10 | Every $4^{th}$ invalid subframe | 2 (every second radio frame) |
| 11 | Every $4^{th}$ invalid subframe | 4 (every fourth radio frame) |

Fig. 8

CONFIGURATION OF ADDITONAL SYSTEM INFORMATION BLOCK REPETITIONS

CROSS REFERENCE TO RELATED APPLICATIONS

This application is a 35 U.S.C. § 371 national phase filing of International Application No. PCT/SE2018/050917, filed Sep. 12, 2018, the content of which is incorporated herein by reference in its entirety, which claims the benefit of U.S. Provisional Application Ser. No. 62/565,424, filed Sep. 29, 2017, entitled CONFIGURATION OF ADDITIONAL SYSTEM INFORMATION BLOCK REPETITIONS.

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There have been recent developments in 3GPP specifying technologies to cover Machine-to-Machine (M2M) and/or Internet of Things (IoT) related use cases. Most recent work for 3GPP Release 13 and 14 includes enhancements to support Machine-Type Communications (MTC) with new user equipment (UE) categories (Cat-M1, Cat-M2), supporting reduced a bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2).

The LTE enhancements introduced in 3GPP Releases 13, 14 and 15 for MTC are referred to as "eMTC", including (but not limited to) support for bandwidth limited UEs, Cat-M1, and support for coverage enhancements. This is to separate from discussion of NB-IoT (notation here used for any Release), although the supported features are similar on a general level.

By using techniques, e.g., power boosting and repetitions, the coverage for NB-IoT devices may be enhanced compared to the legacy LTE system. However, for wireless devices in low coverage areas, it may take some time to acquire the system information.

To improve this the following may be considered. One approach is to improve cell search and/or system information (at least MIB-NB) acquisition performance, for all operation modes. The acquisition time for a SystemInformationBlockType1-NB (SIB1-NB) may also benefit from improvement. It is noted that the number of subframes that carry SIB1-NB may be increased in order to improve the acquisition performance of SIB1-NB.

One disadvantage is that these additional subframes are not known to the legacy Rel-13 and Rel-14 NB-IoT wireless devices. In Rel-13 and Rel-14, when a subframe is used for SIB1-NB transmission, this subframe is not counted as part of the NB-IoT DL subframe. Therefore, as the legacy wireless devices are unaware of the additional subframes being used for SIB1-NB they may count these subframes erroneously as part of the NB-IoT DL subframe. Therefore, downlink (DL) channels, e.g., NPDSCH, NPDCCH may inadvertently be mapped to the subframes that are used by SIB1-NB. If additional subframes are used for SIB1-NB transmission, the new additional subframes are not known to the legacy Rel-13 and Rel-14 NB-IoT wireless devices. Therefore, effective signaling may be used to minimize the impact.

There currently exist certain challenge(s). Invalid subframes may be used as introduced in Rel-13 to allow the network to reserve subframes for other uses. In other words, invalid subframes are subframes during which the wireless device does not monitor for any downlink transmissions. These invalid subframes may be used to indicate to legacy wireless devices when not to monitor subframes. Therefore subframes which are introduced for repetitions of a SIB1-NB transmission may be set as invalid subframes for Rel-13 and Rel-14 NB-IoT wireless devices through a bitmap signaled in the legacy SIB1-NB.

However, there are several problems for this solution. Firstly, the length of the valid subframe bitmap configuration is 10 ms for standalone/guardband, and 40 ms for inband. Therefore, the minimum overhead is 10% for standalone/guardband, and 2.5% for inband. For the standalone/guardband operations, the overhead is too high. Secondly, the number of subframes used for repetitions of the SIB1-NB may be configurable by the network, as not all cells will be configured for the same level of coverage. It may be restrictive to use the valid/invalid subframe bitmap to indicate subframes used for repetitions of the SIB1-NB. This is because the length of the current valid/invalid subframe bitmap is restricted, and it is not certain whether all subframes marked as invalid would be needed for the repetitions of the transmission of SIB1-NB. Furthermore, the UE may need to be aware of the scheduling information for any repetition of a SIB1-NB before receiving the repetition of the SIB1-NB. Currently, the scheduling information for the SIB-NB is transmitted to the wireless device in the Master-InformationBlock-NB (MIB-NB). Therefore, if additional subframes are introduced for SIB1-NB, the new scheduling information for the additional subframes may also be signaled in the MIB-NB. However, due to the limited size of the MIB-NB, it is not possible to signal a long bitmap indicating which subframes are to be used for the additional SIB1-NB.

SUMMARY

Certain aspects of the present disclosure and their embodiments may provide solutions to these or other challenges. According to one solution, there is provided a predetermined mapping or pattern for the additional subframes introduced for SIB1-NB transmission. The predetermined mapping or pattern may be signaled to the wireless devices using the valid/invalid subframe bitmap. Any legacy wireless devices may then interpret the valid/invalid subframe bitmap in a conventional manner, in other words, the legacy wireless devices may omit monitoring downlink transmissions during any subframe designated as an invalid subframe. This ensures that any legacy wireless devices can operate without interference from any additional SIB1-NB transmission. There is also provided a wireless device configured to re-interpret the meaning of the valid/invalid subframe bitmap, and make use of the additional SIB1-NB repetitions, and at the same time use the subframes indicated as invalid for legacy wireless device, but not used for additional SIB1-NB, for monitoring on other DL channels. The predetermined mapping or pattern may be transmitted to the wireless device in the MIB-NB.

There are, proposed herein, various embodiments which address one or more of the issues disclosed herein. According to one aspect there is provided a method performed by a wireless device, operable to communicate with a base station in a communications network, for determining which of a plurality of subframes are repetition subframes, wherein repetition subframes are subframes scheduled for use by the base station to transmit a repetition of a system information block, the method comprising: receiving a first mapping comprising information designating a subset of the plurality of subframes as invalid subframes. The method further comprises determining, based on the first mapping and a second mapping, which of the subframes designated as invalid subframes are repetition subframes, wherein the second mapping comprises information designating at least one of the subset of the plurality of subframes as a repetition subframe.

According to one aspect there is provided a method performed by a base station operable in a communications network for indicating to a wireless device which of a plurality of subframes are repetition subframes scheduled for use by the base station to transmit a repetition of a system information block, the method comprising: transmitting a first mapping comprising information designating a subset of the plurality of subframes as invalid subframes; wherein at least one of the subframes designated as an invalid subframes is a repetition subframe. The method further comprises transmitting an indication of which of the subset of the plurality of subframes are repetition subframes.

According to another aspect there is provided a method performed by a wireless device, operable in a communications network, for determining whether to monitor for a repetition of a system information block, the method comprising: receiving an indication of whether a repetition of the system information block is scheduled for transmission; and in response to the indication, monitoring a subframe configured for receipt of the repetition of the system information block.

Certain embodiments may provide one or more of the following technical advantage(s). The embodiments described herein provide a flexible configuration and signaling of the additional SIB1-NB repetitions. The use of a small bitmap or index value in the MIB-NB to indicate the scheduling information of the additional SIB1-NB subframes, ensures efficient resource utilization for the downlink (DL) transmissions. The invalid subframes that are set for the legacy wireless devices may be used by wireless devices according to embodiments disclosed herein for monitoring DL transmissions of additional SIB1-NB.

BRIEF DESCRIPTION OF THE DRAWINGS

For a better understanding of the present embodiments, and to show how they may be put into effect, reference will now be made, by way of example only, to the accompanying drawings, in which:

FIG. 1 illustrates an example of a valid subframe bitmap;
FIG. 2 is an example of a second mapping;
FIG. 3 illustrates an example of a fourth mapping;
FIG. 4 illustrates an example of a third mapping;
FIG. 5 illustrates an example of a third mapping;
FIG. 6 illustrates an example of a first mapping;
FIG. 7 illustrates an example of a first mapping;
FIG. 8 illustrates an example of a fourth mapping.

DESCRIPTION

Figure 9:
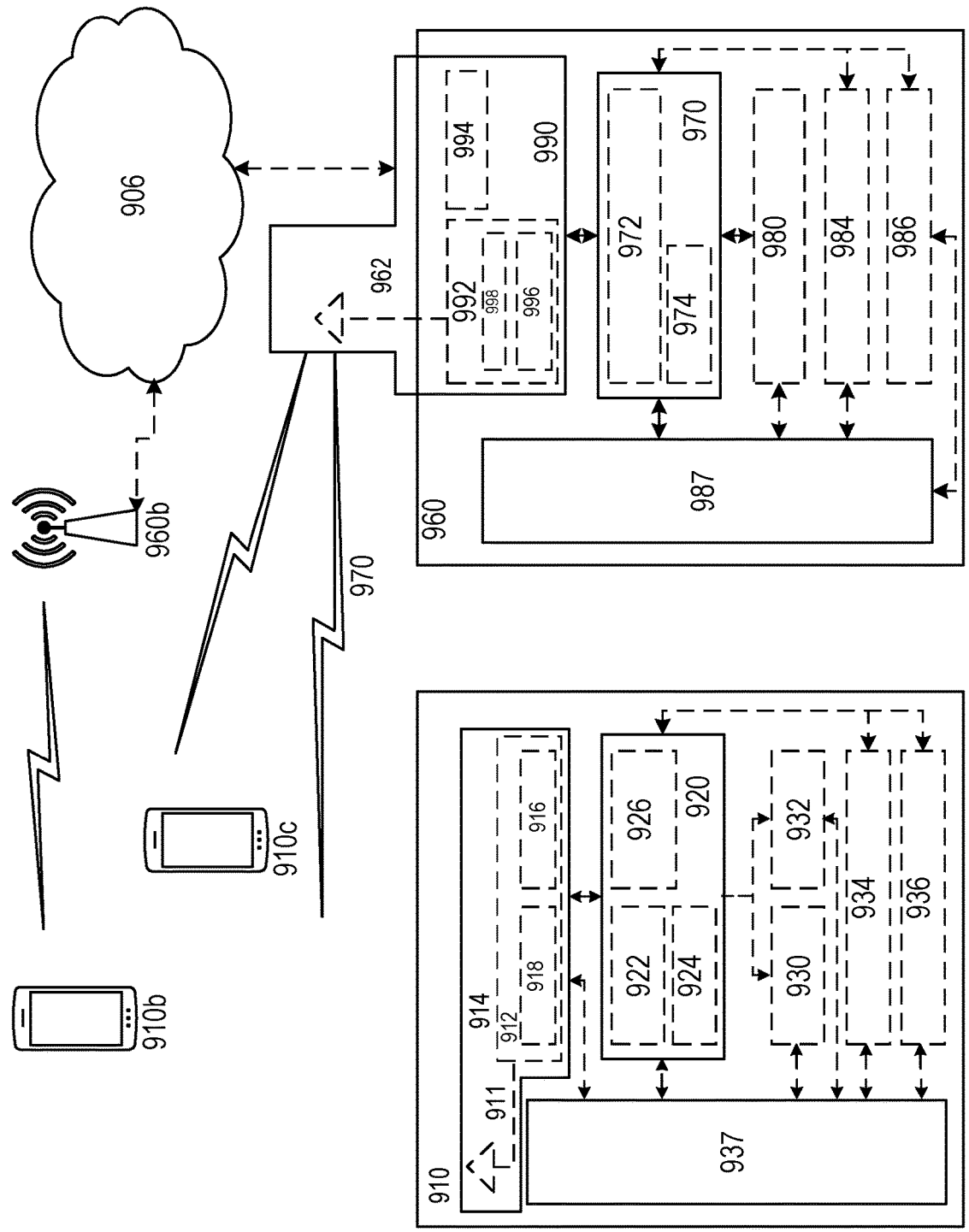
FIG. 9 illustrates a wireless network in accordance with some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail.

The present embodiments relate to a method for determining which of a plurality of subframes are repetition subframes scheduled for use by the base station to transmit a repetition of a system information block. For example, the embodiments described herein relate to the use of a first mapping, which may be a valid/invalid subframe bitmap, and a second mapping to determine which of the subset of the plurality of subframes designated by the first mapping as invalid subframes are repetition subframes. For example, the second mapping may comprise information designating at least one of the subset of the plurality of subframes as a repetition subframe.

According to embodiments of the disclosure, a base station transmits repetitions of a system information block (SIB); that is, the base station transmits at least one initial SIB and at least one repetition of that initial SIB. The base station further transmits a first mapping, which may be a valid/invalid subframe bitmap, used by a wireless device to determine which subframes are designated as invalid. Invalid subframes may be used as introduced in Rel-13 to allow the network to reserve subframes for other uses. In other words, invalid subframes are subframes during which the wireless device does not monitor for any downlink transmissions. The first mapping may be transmitted as part of a master information block (MIB).

According to embodiments of the disclosure, the base station uses one or more of the subframes designated as invalid to transmit the repetitions of the SIB. In the present disclosure the term repetition subframe will be used to denote subframes which are scheduled for use by a base station to transmit a repetition of a system information block, for example an SIB1-NB. Any subframes which are repetition subframes may be designated as invalid subframes through the first mapping. In this way, any legacy wireless device may interpret the first mapping in a conventional way and operate without interference from the new additional SIB1-NB transmissions.

Wireless devices according to embodiments described herein, however, may be able to re-interpret the meaning of the first mapping, and make use of the repetition subframes. Furthermore, any subframes designated as invalid in the first mapping, which are not repetition subframes, may be used for other DL channels. Thus wireless devices may utilize the first mapping, and a second mapping described hereinafter, to receive the SIB transmissions in the repetition subframes.

A second mapping, for example a second bitmap, is thus used by wireless devices according to embodiments described herein to reinterpret the first mapping and determine which of the invalid subframes are repetition subframes. In some embodiments, the second mapping may be based on existing parameters (e.g., cell ID (or PCID) or other fields in the MIB-NB), or explicitly specified in the specifications, or signaled in the MIB-NB transmitted by the base station.

Figure 1:
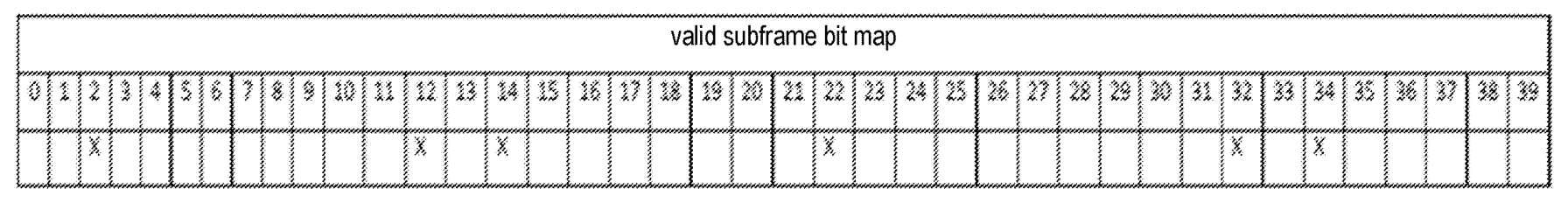

As noted above, in some embodiments, the first mapping comprises a valid subframe bitmap. FIG. 1 illustrates an example of a valid subframe bitmap (also referred to herein as "valid/invalid subframe bitmap").

FIG. 1 illustrates an example of a valid subframe bitmap.

In this example, the valid subframe bitmap is a valid subframe bitmap for an inband deployment mode. In other words, the valid subframe bitmap comprises 40 bits. These 40 bits may be separated into 4 frames, wherein each frame has frame length of 10 bits. In some examples, the valid subframe bitmap may be for standalone/guardband modes of operation. In these examples, the valid subframe bitmap may comprise 10 bits.

In FIG. 1, each invalid subframe is denoted by an "X". It will be appreciated that this information may be indicated using any suitable representation, for example valid subframes may be "0" and invalid subframes may be "1". In this example therefore, subframes 2, 12, 14, 22, 32 and 34 are designated as invalid subframes in the valid subframe bitmap. It will be appreciated that the number and positions of invalid subframes are an example for illustration purposes.

As described earlier, at least one invalid subframe in the first mapping is a repetition subframe. In other words, the base station is configured to designate any subframe which is scheduled for the transmission of a repetition of a system information block as an invalid subframe in the first mapping, alongside any other invalid subframes.

A second mapping may then be used by the wireless device to interpret the first mapping and to determine which of the subframes designated as invalid in the valid subframe bitmap are repetition subframes. For example, the second mapping may comprise a second bitmap as shown in FIG. 2.

FIG. 2 is an example of a second mapping.

In this example, as there are 6 subframes designated as invalid subframes in the valid subframe bitmap, the length of the second bitmap is 6. Here, according to this example, every 3rd invalid subframe is used for the extra repetitions of SIB1-NB.

The bitmap shown in FIG. 2 associates each of the invalid subframes in the valid subframe bitmap with a respective indicator (e.g. an index) indicating whether the respective invalid subframe is designated as a repetition subframe. In this example therefore, the indexes 0 to 5 represent the invalid subframes 2, 12, 14, 22, 32 and 34 in the valid subframe bitmap of FIG. 1. In this example, the subframes which are designated as repetition subframes are associated with an "X".

In other words, the subframes 14 and 34 of the first mapping, i.e. the valid subframe bitmap of FIG. 1, are designated as repetition subframes by the second bitmap. The wireless device according to embodiments herein will therefore know to monitor the subframes 14 and 34 for repetitions of a system information block, for example SIB1-NB.

In this example therefore, the second bitmap has a length equal to the number of invalid subframes in the first mapping, to indicate which of these subframes are used for the extra repetitions of SIB1-NB. This second bitmap may be transmitted to wireless devices in a master information block, MIB-NB.

The remaining subframes designated as invalid in the first mapping, for example subframes 2, 12, 22 and 32 may be used by a wireless device for knowing which subframes to skip for a Narrowband Physical Downlink Control Channel (NPDCCH) reception and for receiving a Narrowband Physical Downlink Shared Channel (NPDSCH) reception that does not carry SIB1-NB.

However, there are currently 11 spare bits in a master information block MIB-NB. Therefore if a large number of subframes are designated as invalid subframes in the first mapping, the second mapping to be transmitted in the MIB-NB needs to be long. It is unlikely that 10 out of these currently spare bits may be used for this purpose. If a 40 bit length is used for the second mapping, for example, it may not be possible to transmit the second mapping as part of the master information block.

In some embodiments therefore, the second mapping comprises an indication of a value M, wherein the value M indicates that every $M^{th}$ subframe in the subset of the plurality of subframes in the first mapping is designated as a repetition subframe. In this example, the length of the second mapping can be shortened as only the value of M needs to be signaled to the wireless device. In this example, therefore, if a large number of subframes are designated as invalid subframes in the first mapping, the length of the second mapping does not change.

In one example therefore, the second mapping may comprise the value "3" signaled by a field in the master information block. In this example, every $3^{rd}$ subframe in the subset of the plurality of subframes is designated as a repetition subframe. Therefore, for the example of FIG. 1 subframes 14 and 34 are designated as repetition subframes.

In some embodiments, the second bitmap may vary in size from 1 to 40 bits which may be problematic since 40 bits may therefore always have to be used in MIB1-N B to cover the worst case scenario. Therefore, an index value indicating which of a plurality of pre-configured second mappings to use may be transmitted by the base station to the wireless devices.

In some embodiments a fourth mapping is used in addition to the first and second mappings. For example the fourth mapping may comprise information associating a plurality of index values with respective second mappings. FIG. 3 illustrates an example of a fourth mapping.

The wireless device according to some embodiments may therefore store the predetermined fourth mapping, and the predetermined second mappings A to D, in memory associated with the wireless device. For example, the fourth mapping may be set out in a standard implemented by the wireless device, or otherwise pre-configured via signaling from the base station. Similarly, the predetermined second mappings may be signaled from the base station, or set out in a standard implemented by the wireless device. Therefore, instead of signaling the second mapping to the wireless device, the base station may signal an indication of an index value associated with the required second mapping in the fourth mapping. In this way, more complicated second mappings may be used without increasing the number of bits required within the master information block.

It will be appreciated that existing fields of the master information block may be used as the index value. For example, the cell identification transmitted as part of the master information block may be used as the index value. The fourth mapping may therefore in some embodiments map cell identification values to second mappings to be used by that specific cell. The mappings A to D may be for example mappings indicating different values of M, where every Mth subframe in the subset of the plurality of subframes is designated as a repetition subframe.

In Narrowband Internet of Things (NB-IoT) Frequency Division Duplexing (FDD), a frame structure of type 1 is used, where 10 subframes are available for downlink transmission in each radio frame. Each radio frame is therefore 10 ms long and consists of 10 subframes [6]. Therefore, a wireless device may determine which subframe(s) are the potential candidates for the additional SIB1-NB transmission in a radio frame by determining which radio frames comprise any repetition subframes. The predetermined resource can be based on the cell ID (or PCID), the system frame number (SFN), other fields in the MIB-NB, or explicitly signaled. Similar to as described above, the predetermined subframe(s) may be designated as invalid subframes in the first mapping, so that legacy wireless devices may operate without being interfered with by the new additional SIB1-NB transmissions. Wireless devices according to embodiments described herein, however, can re-interpret the meaning of the first mapping, and make use of the system information block repetitions, and at the same time use the subframes indicated as invalid but not used for additional SIB1-NB, for other downlink channels.

In some embodiments therefore, the plurality of subframes in the first mapping are divided into one or more frames, and a third mapping may be used to indicate whether each of the one or more frames in the first mapping comprises any repetition subframes.

The third mapping may comprise a bitmap or a new information field in MIB-NB used to indicate which of the at least one radio frames is used for the transmission of the additional SIB1-NB. If a bitmap is used for the indication, the indication may repeat periodically based on the length of the bitmap with the starting point of the system frame number (SFN) being SFN=m, e.g. m=0. That is if the length of the bitmap is 4, then this indicates that the pattern may appear periodically every 40 ms (i.e. every four frames). If a new information field is used in the MIB-NB, then similarly to as described above, the third mapping may comprise a value N which indicates that the subframe(s) used for the additional SIB1-NB transmissions appear in every Nth radio frame as indicated by the field. Where the repetition subframes appear within the radio frame indicated in the third mapping may be determined according to a second mapping as described herein. In some embodiments, the second mapping may be a predetermined mapping, for example the second mapping may indicate that every 8th subframe in a frame is designated as a repetition subframe.

In some embodiments, radio frames designated by the third mapping as containing repetition subframes may be the frames for which the following is fulfilled:

SFN mod(M)=0 wherein the value M may be signaled in MIB-NB with an index/field as shown in FIG. 4, using a 2 bit index as an example. FIG. 4 illustrates an example of a third mapping.

In some embodiments the index value may be based on the cell ID (PCID) and/or other existing fields in the MIB, e.g., the operation mode, or simply specified in the standard.

For some embodiments, no flag will be used for indicating whether additional SIB1-NB repetitions are broadcast in the cell as it may be implicit to the wireless device from the procedures described above.

In some embodiments a bitmap is used as the third mapping. For example, firstly, it is determined that the second mapping designates every eighth subframe in a radio frame as a repetition subframe. It will be appreciated that there may be more than one subframe used for additional SIB1 transmission per frame. Furthermore, a bitmap (e.g. of length 4 as shown in FIG. 5) may be used to indicate which radio frame is used for the additional SIB1-NB transmission. Therefore, the base station signals the following SIB1-NB radio frames as comprising one or more repetition subframes. FIG. 5 illustrates this example of a third mapping.

In this example therefore (where the second mapping indicates the eighth subframe in a frame as a repetition subframe), for a 40 ms period, subframe number 8 in every $2^{nd}$ and $3^{rd}$ radio frame is designated for use as a repetition subframe.

Figure 6:
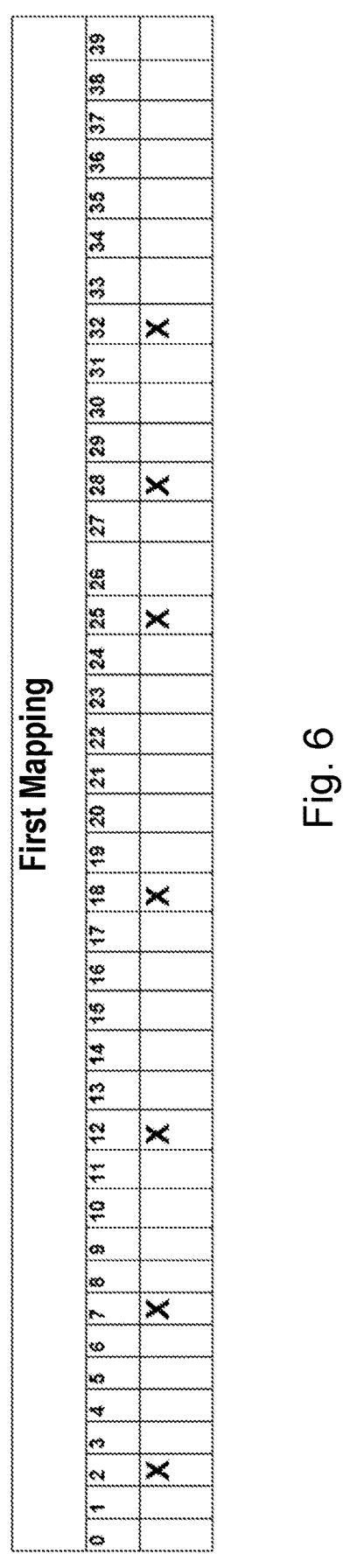

For this example therefore the first mapping illustrated in FIG. 6 may be transmitted to wireless devices for inband operation.

In this example, the designated invalid subframes are indicated with an "X". Further, the designated invalid subframes comprise the subframes 18 and 28 which are the subframes designated by the third mapping and the second mapping as repetition subframes. A wireless device according to some embodiments may therefore determine from the first mapping, the third mapping and the second mapping, which of these plurality of invalid subframes indicated by the first mapping are repetition subframes, and which subframes designated as invalid subframes may be skipped in case of NPDCCH reception and in case of receiving NPDSCH that does not carry SIB1-NB. In other words, in this example, the subframes 2, 7, 12, 25 and 32 may be skipped in case of NPDCCH reception and in case of receiving NPDSCH that does not carry SIB1-NB.

Legacy wireless devices may receive the first mapping illustrated in FIG. 6 and interpret every subframe indicated with an "X" as an invalid subframe.

As an example embodiment for standalone/guardband operation, the first mapping shown in FIG. 7 may be transmitted.

In this example, the first mapping comprises only 10 bits, in other words, a single frame. The second mapping, as described above indicates that the $8^{th}$ subframe in each frame may be a repetition subframe. Therefore the $8^{th}$ subframe in the first mapping of FIG. 7 is designated as an invalid subframe. The invalid subframe 2 is another invalid subframe signaled by the first mapping. Wireless devices according to embodiments described herein may therefore determine that the subframe 2 is a subframe which may be skipped in case of NPDCCH reception and in case of receiving NPDSCH that does not carry SIB1-NB.

In some embodiments, the fourth mapping may associate index values with respective combinations of second mappings and third mappings. In other words, the fourth mapping may be used to determine in which frames there are repetition subframes, and how the repetition subframes are distributed within the frame. An example of such a fourth mapping is illustrated in FIG. 8. In this example, a single index value may be transmitted to the wireless device which may determine from the fourth mapping which respective third mapping and second mapping to utilize to determine which subframes in the plurality of subframes in the first mapping are repetition subframes. This minimizes the number of bits required to be signaled by the base station in the master information block.

In some embodiments, the signaling to be transmitted by the base station is further reduced by using implicit or existing signaling (parameters) to determine the repetition subframes. Wireless devices according to some embodiments can determine, based on existing fields in the master information block, MIB-NB, and/or other existing signaling (parameters) e.g., cell ID (or PCID) and/or SFN, which subframes in which radio frames are repetition subframes. In some embodiments, depending on the scheduling information, not all the repetition subframes that the wireless determines are actually used for the SIB1-NB transmission.

Thus the first mapping, for example a valid/invalid subframe configuration bitmap, may be transmitted to all wireless devices, including both legacy (for example Rel-13 and Rel-14 NB-IoT UEs) wireless devices and wireless devices according to embodiments described herein, for example Rel-15 UEs. However, the different groups of wireless devices may interpret the first mapping differently. The legacy wireless devices may interpret the invalid subframes in the first mapping as invalid subframes.

However, for wireless devices according to embodiments described herein, any subframes designated as invalid subframes in the first mapping which are designated as repetition subframes by the second mapping but not actually scheduled for the transmission of additional SIB1-NB may not be treated as invalid but may be used for other DL channels as a regular valid subframe. The Rel-15 NB-IoT UE may determine whether the subframe is used for repetitions of the SIB1-NB transmission either from explicit signaling from the base station (e.g., a bitmap), or derive it from the scheduling information of the SIB1-NB transmissions (e.g., based on the modulation and coding scheme and number of repetitions). Notice, there can be a new information field in the MIB to indicate additional scheduling information of the SIB1-NB for Rel-15 NB-IoT UEs.

In some embodiments repetition subframes may be explicitly specified in the standard implemented by the network, and a simple on/off flag may be added to MIB-NB (for example using 1 spare bit) to indicate when repetition subframes are being used. In other words, a wireless device may receive an indication of whether a repetition of the system information block is scheduled for transmission; and in response to the indication, monitor a subframe configured for receipt of the repetition of the system information block.

FIG. 9 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signaling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
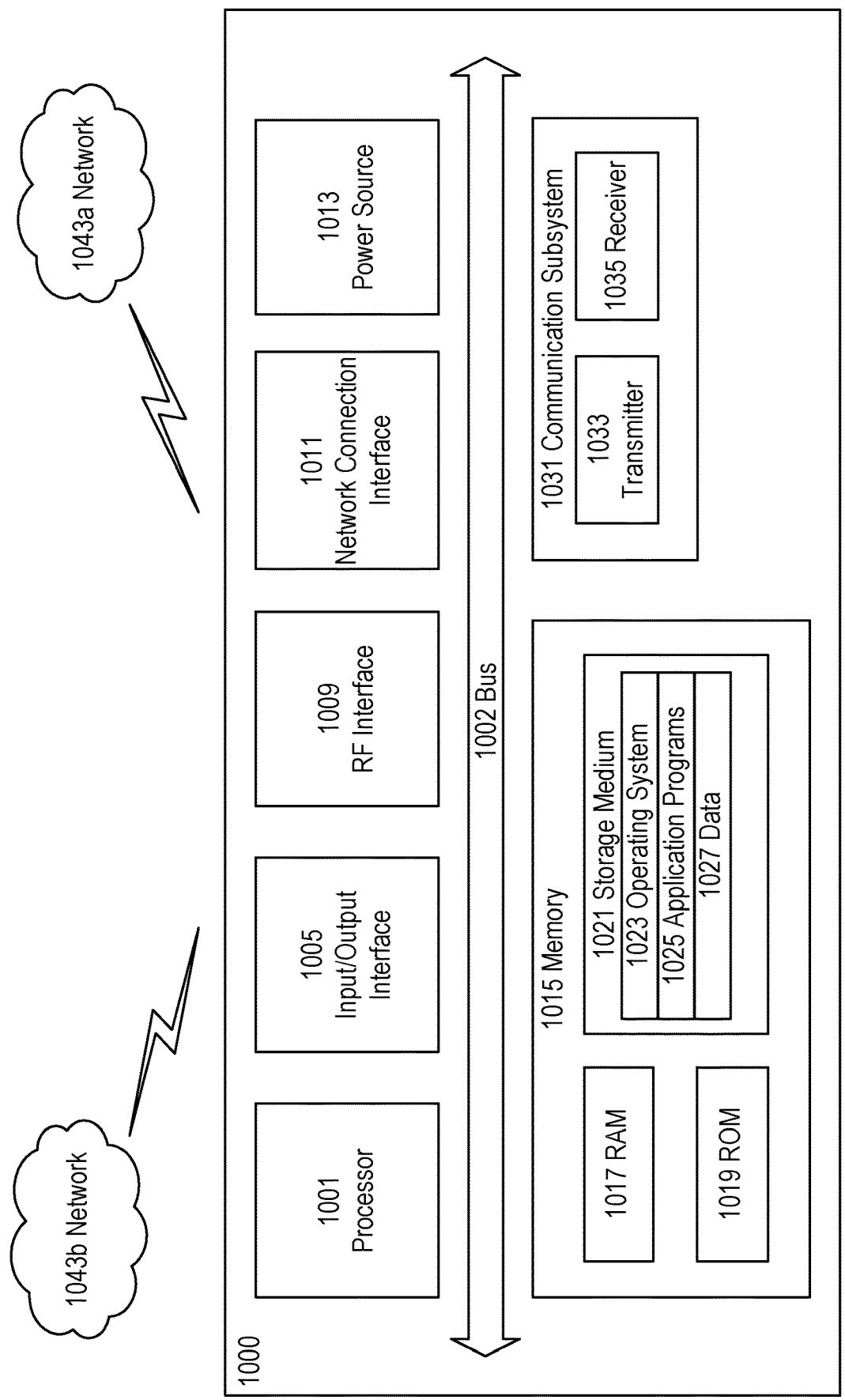
FIG. 10 illustrates a User Equipment in accordance with some embodiments.

FIG. 10 illustrates a User Equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the $3^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
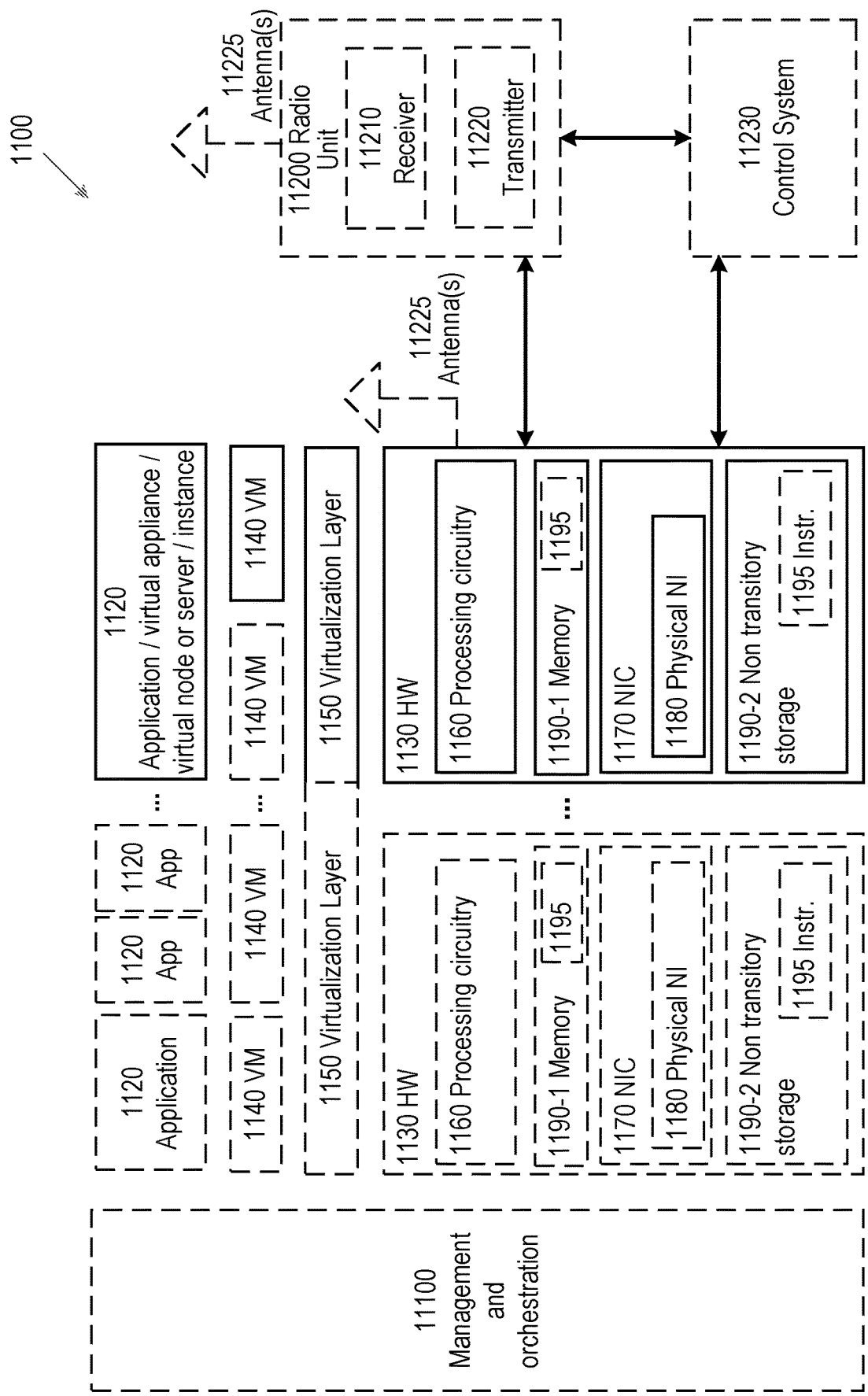
FIG. 11 illustrates a Virtualization environment in accordance with some embodiments.

FIG. 11 illustrates a Virtualization environment in accordance with some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signaling can be effected with the use of control system 11230 which may alternatively be used for communication between the hardware nodes 1130 and radio units 11200.

Figure 12:
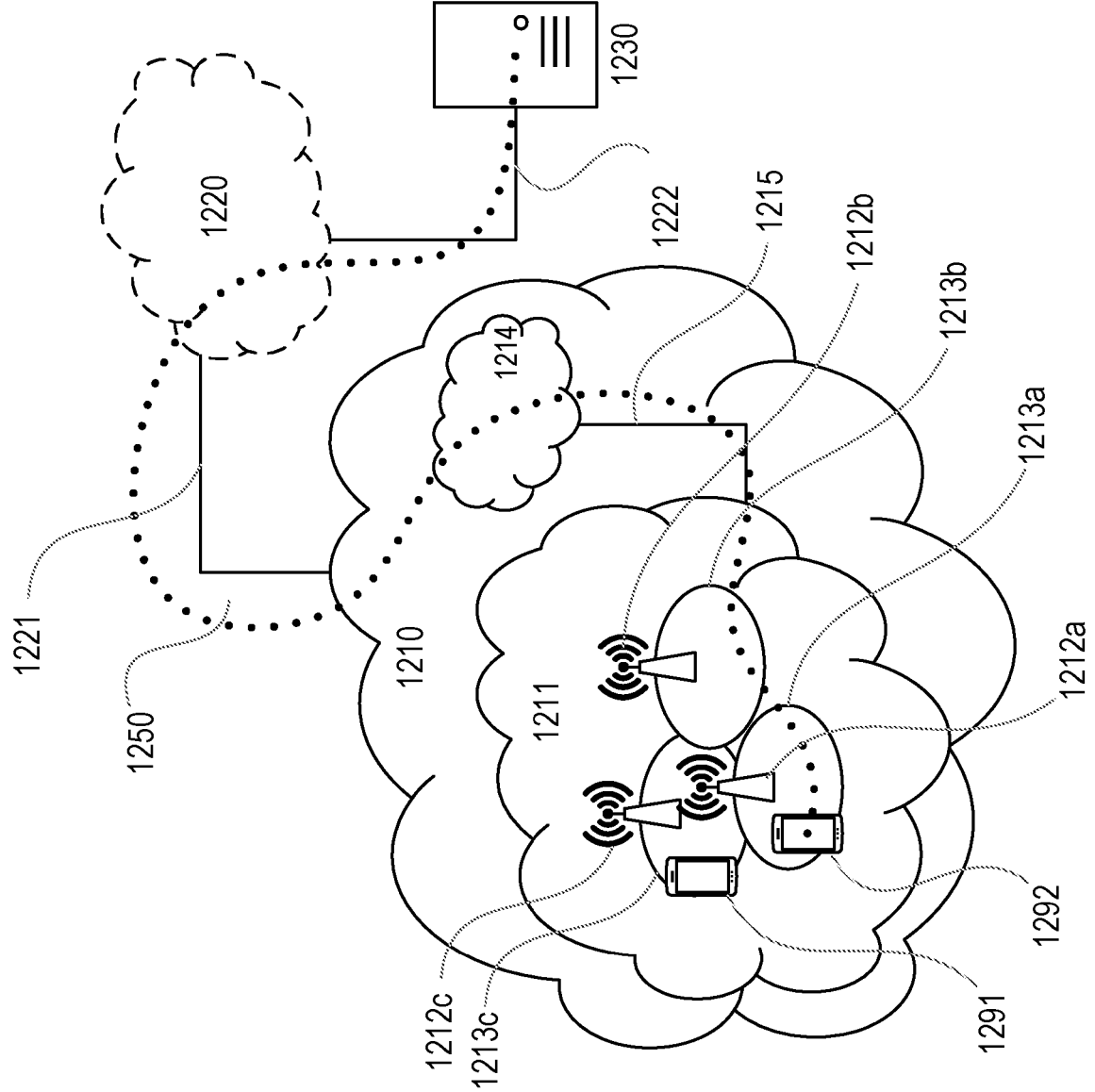
FIG. 12 illustrates a Telecommunication network connected via an intermediate network to a host computer in accordance with some embodiments.

FIG. 12 illustrates a Telecommunication network connected via an intermediate network to a host computer in accordance with some embodiments. With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
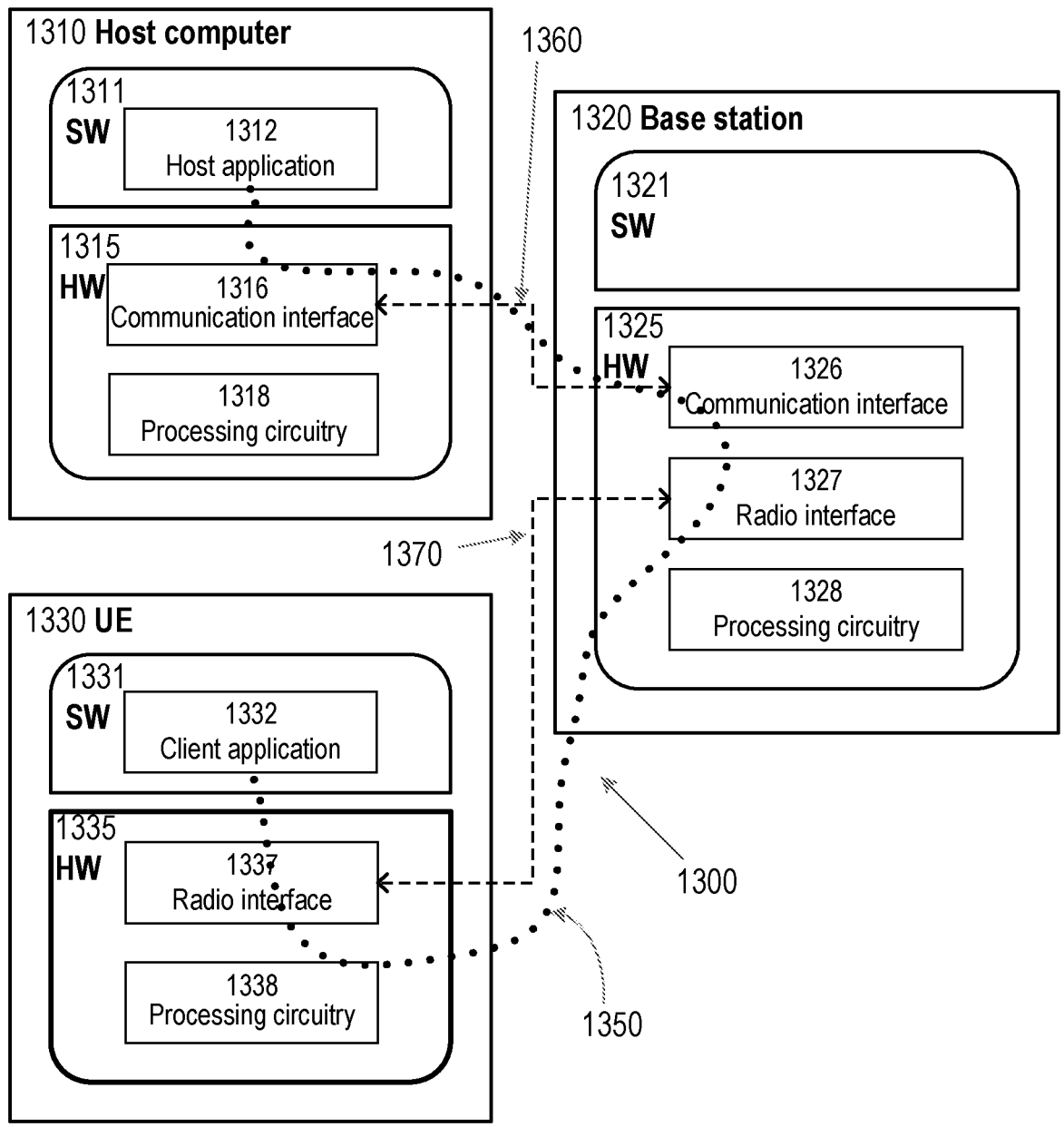
FIG. 13 illustrates a host computer communicating via a base station with a user equipment over a partially wireless connection in accordance with some embodiments.

FIG. 13 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the number of bits required to signal to wireless devices which subframes are scheduled for transmission of a repetition of a system information block and thereby provide benefits such as better responsiveness, and reduced overhead.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
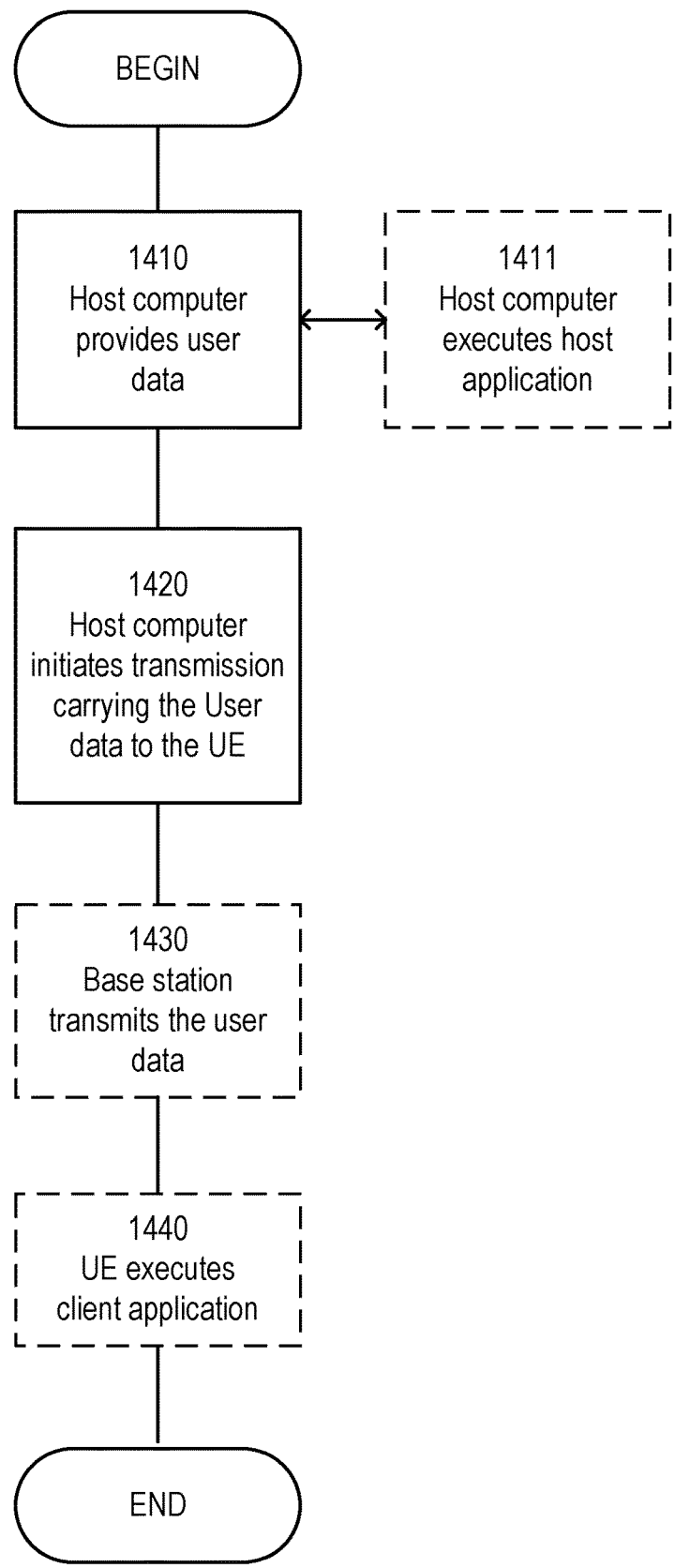
FIG. 14 illustrates methods implemented in a communication system including a host computer, a base station and a user equipment in accordance with some embodiments.

FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
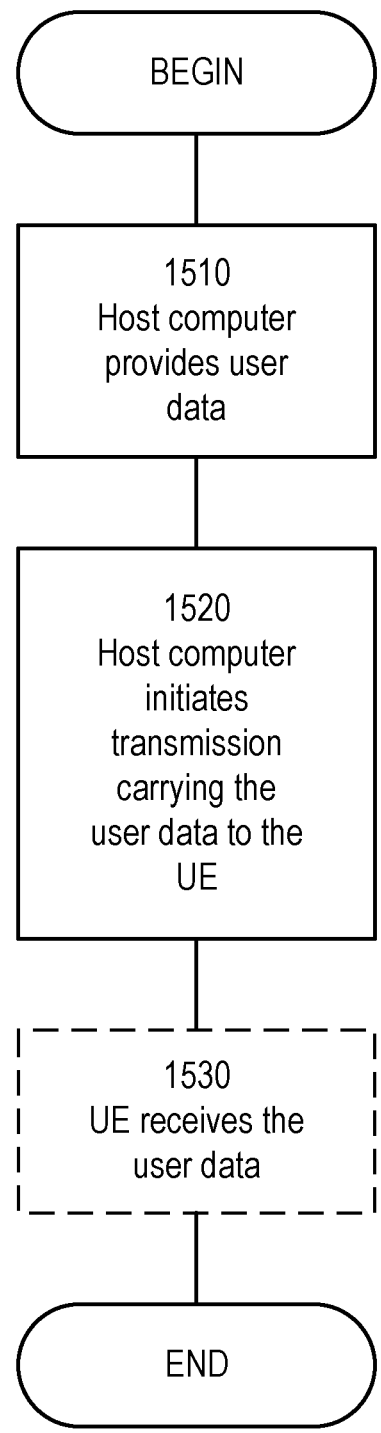
FIG. 15 illustrates methods implemented in a communication system including a host computer, a base station and a user equipment in accordance with some embodiments.

FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
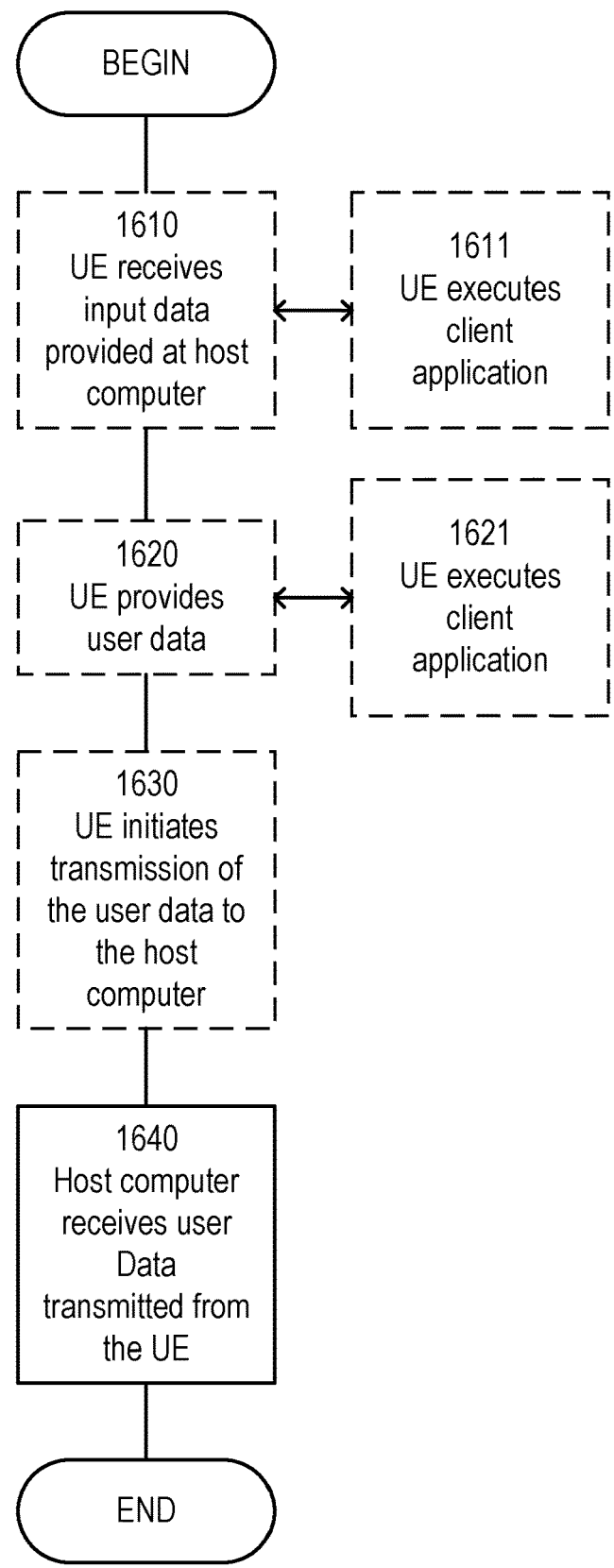
FIG. 16 illustrates methods implemented in a communication system including a host computer, a base station and a user equipment in accordance with some embodiments.

FIG. 16 illustrates methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
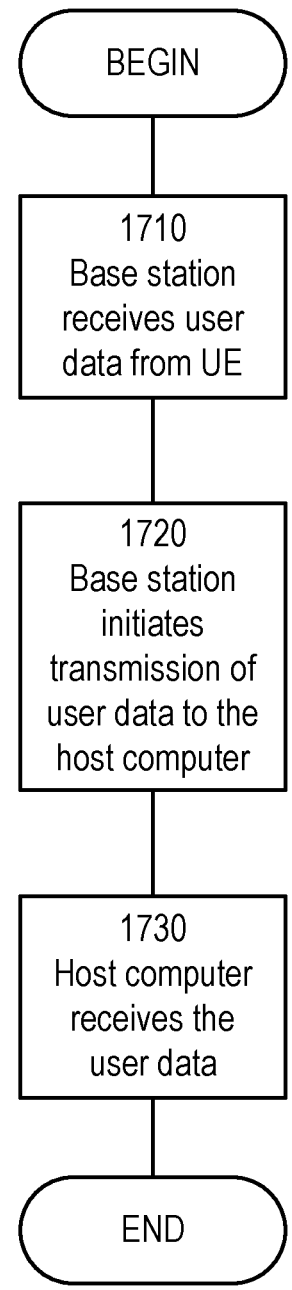
FIG. 17 illustrates methods implemented in a communication system including a host computer, a base station and a user equipment in accordance with some embodiments.

FIG. 17 illustrates methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Figure 18:
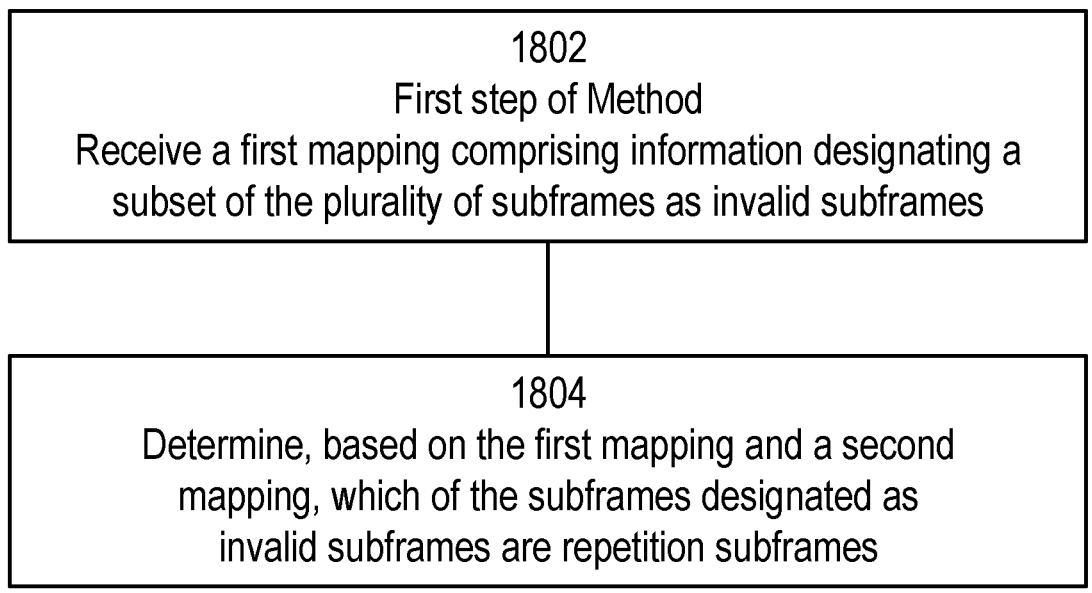
FIG. 18 illustrates a Method in accordance with some embodiments.

FIG. 18 illustrates a method in accordance with some embodiments.

FIG. 18 depicts a method in accordance with particular embodiments, the method begins at step 1802 with receiving a first mapping comprising information designating a subset of the plurality of subframes as invalid subframes. In step 1804 the method comprises determining, based on the first mapping and a second mapping, which of the subframes designated as invalid subframes are repetition subframes, wherein the second mapping comprises information designating at least one of the subset of the plurality of subframes as a repetition subframe.

Figure 19:
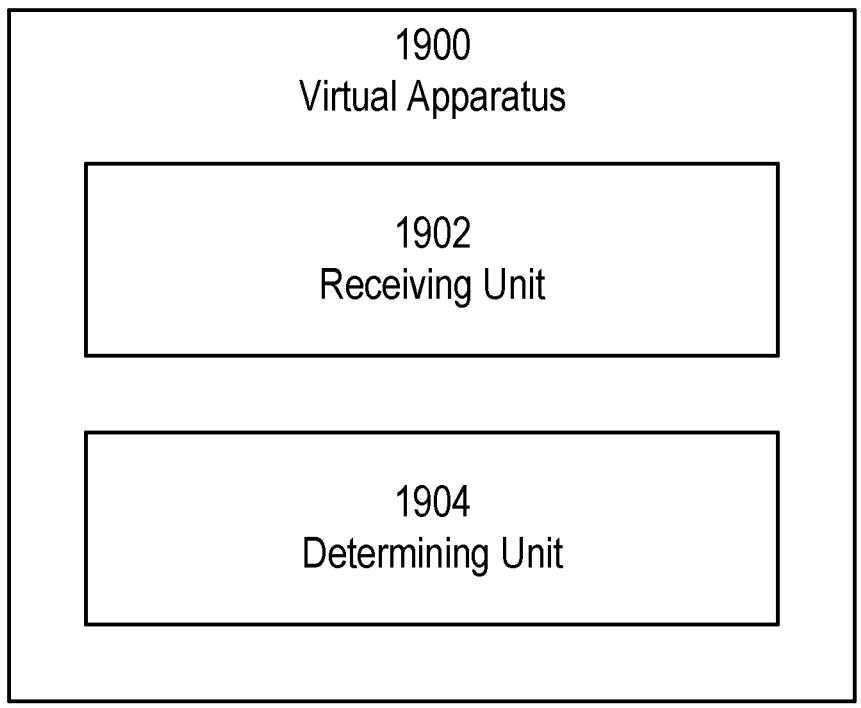
FIG. 19 illustrates a schematic block diagram of an apparatus 1900 in a wireless network.

FIG. 19 illustrates a schematic block diagram of an apparatus 1900 in a wireless network (for example, the wireless network shown in FIG. 9). The apparatus may be implemented in a wireless device or network node (e.g., wireless device 910 or network node 960 shown in FIG. 9). Apparatus 1900 is operable to carry out the example method described with reference to FIG. 18 and possibly any other processes or methods disclosed herein. It is also to be understood that the method of FIG. 18 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1902, determining unit 1904, and any other suitable units of apparatus 1900 to perform corresponding functions according one or more embodiments of the present disclosure.

As illustrated in FIG. 19, apparatus 1900 includes receiving unit 1902, and determining unit 1904, wherein the receiving unit 1902 is configured to receive a first mapping comprising information designating a subset of the plurality of subframes as invalid subframes, and the determining unit 1904 is configured to determine, based on the first mapping and a second mapping, which of the subframes designated as invalid subframes are repetition subframes, wherein the second mapping comprises information designating at least one of the subset of the plurality of subframes as a repetition subframe.

Figure 20:
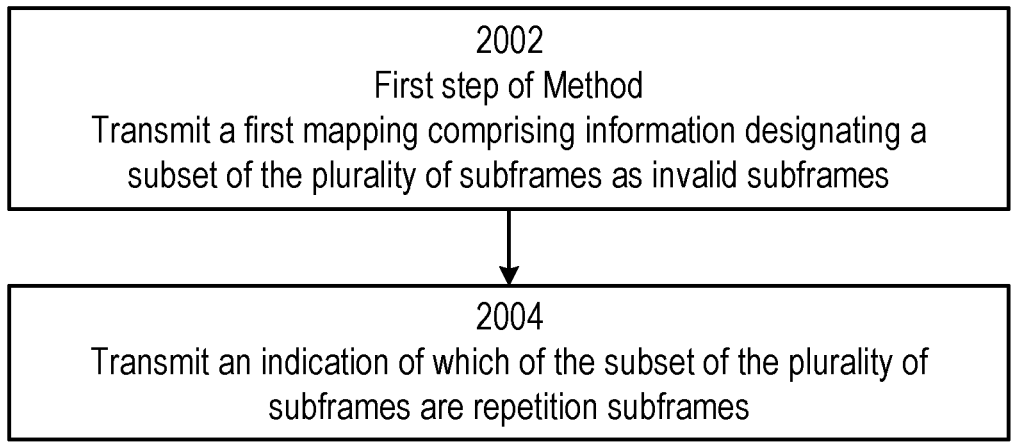
FIG. 20 depicts a method in accordance with particular embodiments.

FIG. 20 depicts a method in accordance with particular embodiments, the method begins at step 2002 with transmitting a first mapping comprising information designating a subset of the plurality of subframes as invalid subframes; wherein at least one of the subframes designated as an invalid subframes is a repetition subframe. In step 2004 the method comprises transmitting an indication of which of the subset of the plurality of subframes are repetition subframes.

Figure 21:
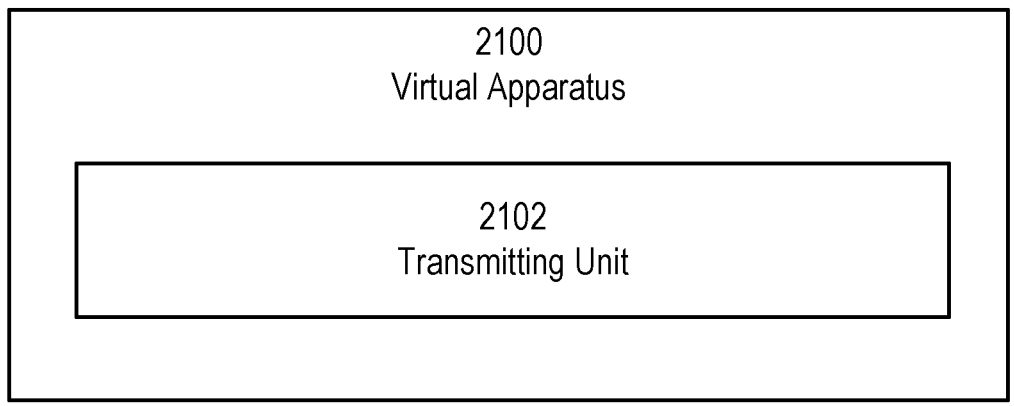
FIG. 21 illustrates a schematic block diagram of an apparatus 2100 in a wireless network.

FIG. 21 illustrates a schematic block diagram of an apparatus 2100 in a wireless network (for example, the wireless network shown in FIG. 9). The apparatus may be implemented in a wireless device or network node (e.g., wireless device 910 or network node 960 shown in FIG. 9). Apparatus 2100 is operable to carry out the example method described with reference to FIG. 20 and possibly any other processes or methods disclosed herein. It is also to be understood that the method of FIG. 20 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 2102, and any other suitable units of apparatus 2100 to perform corresponding functions according one or more embodiments of the present disclosure.

As illustrated in FIG. 21, apparatus 2100 includes transmitting unit 2102 configured to transmit a first mapping comprising information designating a subset of the plurality of subframes as invalid subframes; wherein at least one of the subframes designated as an invalid subframes is a repetition subframe; and transmit an indication of which of the subset of the plurality of subframes are repetition subframes.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method performed by a wireless device, operable to communicate with a base station in a communications network, for determining which of a plurality of subframes are repetition subframes, wherein repetition subframes are subframes scheduled for use by the base station to transmit a repetition of a system information block, the method comprising:
receiving a first mapping comprising information designating a subset of the plurality of subframes as invalid subframes; and
determining, based on the first mapping and a second mapping, which of the subframes designated as invalid subframes are repetition subframes, wherein the second mapping comprises information designating at least one of the subset of the plurality of subframes as a repetition subframe.
2. The method of embodiment 1 wherein the second mapping associates each of the subset of the plurality of subframes with a respective indicator indicating whether the respective subframe is designated as a repetition subframe.
3. The method of any previous embodiment wherein the second mapping comprises a value M, wherein the second mapping indicates that every Mth subframe in the subset of the plurality of subframes is designated as a repetition subframe.
4. The method of embodiment 1 to 3 further comprising receiving the second mapping.
5. The method of embodiment 4 further comprising:
receiving a master information block comprising the first mapping and the second mapping.
6. The method of embodiment 5 wherein the master information block comprises a cell identification parameter which comprises the second mapping.
7. The method of embodiment 1 to 3 wherein the plurality of subframes are separated into one or more frames, the method further comprising:
determining which of the subset of the plurality of subframes are repetition subframes based on a third mapping, wherein the third mapping indicates whether each of the one or more frames comprise any repetition subframes.
8. The method of embodiment 7 wherein the third mapping associates each of the one or more frames with a respective indicator indicating whether each respective frame comprises any repetition subframes.
9. The method of embodiment 7 wherein the third mapping comprises a value N, wherein the third mapping indicates that every Nth frame comprises at least one repetition subframe.
10. The method of one of embodiments 7 to 9 further comprising, if the third mapping indicates that a frame comprises repetition subframes,
using the second mapping to determine which of the subframes within the frame are repetition subframes.
11. The method of one of embodiments 7 to 10 further comprising receiving the third mapping.
12. The method of embodiment 10 further comprising:
receiving a master information block comprising the first mapping and the third mapping.
13. The method of embodiment 12 wherein the master information block comprises a cell identification parameter which comprises the third mapping.
14. The method of any preceding embodiment further comprising determining which of the subset of the plurality of subframes are repetition subframes based on a fourth mapping, wherein the fourth mapping comprises information associating a plurality of index values with a plurality of second mappings.
15. The method of embodiment 14 further comprising:
receiving an indication of an index value; and
using the second mapping associated with the index value in the fourth mapping to determine which of the subset of the plurality of subframes are repetition subframes.
16. The method of embodiment 14 or 15 when dependent on any one of embodiments 8 to 13 wherein the fourth mapping further comprises information associating the plurality of index values with a plurality of third mappings.
17. The method of embodiment 16 further comprising:
using the third mapping associated with the index value in the fourth mapping to determine which of the subset of the plurality of subframes are repetition subframes.
18. The method of any previous embodiment wherein an invalid subframe is a subframe during which the wireless device does not monitor transmissions from the base station.
19. The method of any of the previous embodiments, further comprising:
providing user data; and
forwarding the user data to a host computer via the transmission to the base station.
20. A method performed by a wireless device, operable in a communications network, for determining whether to monitor for a repetition of a system information block, the method comprising:
receiving an indication of whether a repetition of the system information block is scheduled for transmission; and
in response to the indication, monitoring a subframe configured for receipt of the repetition of the system information block.

Group B Embodiments

21. A method performed by a base station operable in a communications network for indicating to a wireless device which of a plurality of subframes are repetition subframes scheduled for use by the base station to transmit a repetition of a system information block, the method comprising:
transmitting a first mapping comprising information designating a subset of the plurality of subframes as invalid subframes; wherein
at least one of the subframes designated as an invalid subframes is a repetition subframe; and
transmitting an indication of which of the subset of the plurality of subframes are repetition subframes.
22. The method of embodiment 21 wherein the indication comprises a second mapping which associates each of the subset of the plurality of subframes with a respective indicator indicating whether the respective subframe is a repetition subframe.
23. The method of embodiment 21 wherein the indication comprises an index value for use in a mapping associating the subset of the plurality of subframes with a respective indicator indicting whether the respective subframe is a repetition subframe.
24. The method of embodiment 21 wherein the subframes are separated into one or more frames and the indication comprises a third mapping associating the one or more frames with an indication of whether the respective frame comprises any repetition subframes.

25. The method of any one of embodiments 21 to 24 wherein a parameter of a master information block comprises the indication.
26. The method of any of embodiments 21 to 25 wherein an invalid subframe is a subframe during which the wireless device does not monitor transmissions from the base station.
27. The method of any of the previous embodiments, further comprising:
   obtaining user data; and
   forwarding the user data to a host computer or a wireless device.

Group C Embodiments

28. A wireless device for determining which of a plurality of subframes are repetition subframes scheduled for use by a base station to transmit a repetition of a system information block, the wireless device comprising:
   processing circuitry configured to perform any of the steps of any of the Group A embodiments; and
   power supply circuitry configured to supply power to the wireless device.
29. A base station for indicating to a wireless device which of a plurality of subframes are repetition subframes scheduled for use by the base station to transmit a repetition of a system information block, the base station comprising:
   processing circuitry configured to perform any of the steps of any of the Group B embodiments;
   power supply circuitry configured to supply power to the wireless device.
30. A user equipment (UE) for determining which of a plurality of subframes are repetition subframes scheduled for use by a base station to transmit a repetition of a system information block, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
31. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.
32. The communication system of the pervious embodiment further including the base station.
33. The communication system of the previous 2 embodiments, further including the UE, wherein the UE is configured to communicate with the base station.
34. The communication system of the previous 3 embodiments, wherein:
   the processing circuitry of the host computer is configured to execute a host application, thereby providing the user data; and
   the UE comprises processing circuitry configured to execute a client application associated with the host application.
35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.
36. The method of the previous embodiment, further comprising, at the base station, transmitting the user data.
37. The method of the previous 2 embodiments, wherein the user data is provided at the host computer by executing a host application, the method further comprising, at the UE, executing a client application associated with the host application.
38. A user equipment (UE) configured to communicate with a base station, the UE comprising a radio interface and processing circuitry configured to performs the of the previous 3 embodiments.
39. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.
40. The communication system of the previous embodiment, wherein the cellular network further includes a base station configured to communicate with the UE.
41. The communication system of the previous 2 embodiments, wherein:
   the processing circuitry of the host computer is configured to execute a host application, thereby providing the user data; and
   the UE's processing circuitry is configured to execute a client application associated with the host application.
42. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.
43. The method of the previous embodiment, further comprising at the UE, receiving the user data from the base station.

44. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

45. The communication system of the previous embodiment, further including the UE.

46. The communication system of the previous 2 embodiments, further including the base station, wherein the base station comprises a radio interface configured to communicate with the UE and a communication interface configured to forward to the host computer the user data carried by a transmission from the UE to the base station.

47. The communication system of the previous 3 embodiments, wherein:
the processing circuitry of the host computer is configured to execute a host application; and
the UE's processing circuitry is configured to execute a client application associated with the host application, thereby providing the user data.

48. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

49. A method implemented in a communication system including a host computer, a base station and a user equipment (UE), the method comprising:
at the host computer, receiving user data transmitted to the base station from the UE, wherein the UE performs any of the steps of any of the Group A embodiments.

50. The method of the previous embodiment, further comprising, at the UE, providing the user data to the base station.

51. The method of the previous 2 embodiments, further comprising:
at the UE, executing a client application, thereby providing the user data to be transmitted; and
at the host computer, executing a host application associated with the client application.

52. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

53. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

54. The communication system of the previous embodiment further including the base station.

55. The communication system of the previous 2 embodiments, further including the UE, wherein the UE is configured to communicate with the base station.

56. The communication system of the previous 3 embodiments, wherein:
the processing circuitry of the host computer is configured to execute a host application;
the UE is configured to execute a client application associated with the host application, thereby providing the user data to be received by the host computer.

57. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

58. The method of the previous embodiment, further comprising at the base station, receiving the user data from the UE.

59. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1× RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality Information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device, operable to communicate with a base station in a communications network, for determining which of a plurality of subframes are repetition subframes, wherein repetition subframes are subframes scheduled for use by the base station to transmit a repetition of a system information block, the method comprising:
receiving a first mapping comprising information designating a subset of the plurality of subframes as invalid subframes; and
determining, based on the first mapping and a second mapping, which of the subframes designated as invalid subframes are repetition subframes, wherein
the second mapping comprises information designating at least one of the subset of the plurality of subframes as a repetition subframe.

2. The method of claim 1 wherein the second mapping associates each of the subset of the plurality of subframes with a respective indicator indicating whether the respective subframe is designated as a repetition subframe.

3. The method of claim 1 wherein the second mapping comprises a value M, wherein the second mapping indicates that every Mth subframe in the subset of the plurality of subframes is designated as a repetition subframe.

4. The method of claim 1 further comprising receiving the second mapping.

5. The method of claim 4 further comprising:
receiving a master information block comprising the first mapping and the second mapping.

6. The method of claim 5 wherein the master information block comprises a cell identification parameter which comprises the second mapping.

7. The method of claim 1 wherein the plurality of subframes are separated into one or more frames, the method further comprising:
determining which of the subset of the plurality of subframes are repetition subframes based on a third mapping, wherein the third mapping indicates whether each of the one or more frames comprise any repetition subframes.

8. The method of claim 7 wherein the third mapping associates each of the one or more frames with a respective indicator indicating whether each respective frame comprises any repetition subframes.

9. The method of claim 1 further comprising determining which of the subset of the plurality of subframes are repetition subframes based on a fourth mapping, wherein the fourth mapping comprises information associating a plurality of index values with a plurality of second mappings.

10. The method of claim 9 further comprising:
receiving an indication of an index value; and
using the second mapping associated with the index value in the fourth mapping to determine which of the subset of the plurality of subframes are repetition subframes.

11. The method of claim 9 wherein the fourth mapping further comprises information associating the plurality of index values with a plurality of third mappings.

12. The method of claim 11 further comprising:
using the third mapping associated with the index value in the fourth mapping to determine which of the subset of the plurality of subframes are repetition subframes.

13. The method of claim 9 wherein an invalid subframe is a subframe during which the wireless device does not monitor transmissions from the base station.

14. A method performed by a base station operable in a communications network for indicating to a wireless device which of a plurality of subframes are repetition subframes scheduled for use by the base station to transmit a repetition of a system information block, the method comprising:

transmitting a first mapping comprising information designating a subset of the plurality of subframes as invalid subframes; wherein
at least one of the subframes designated as an invalid subframes is a repetition subframe; and
transmitting an indication of which of the subset of the plurality of subframes are repetition subframes.

15. The method of claim 14 wherein the indication comprises a second mapping which associates each of the subset of the plurality of subframes with a respective indicator indicating whether the respective subframe is a repetition subframe.

16. The method of claim 14 wherein the indication comprises an index value for use in a mapping associating the subset of the plurality of subframes with a respective indicator indicting whether the respective subframe is a repetition subframe.

17. The method of claim 14 wherein the subframes are separated into one or more frames and the indication comprises a third mapping associating the one or more frames with an indication of whether the respective frame comprises any repetition subframes.

18. The method of claim 14 wherein a parameter of a master information block comprises the indication.

19. The method of claim 14 wherein an invalid subframe is a subframe during which the wireless device does not monitor transmissions from the base station.

* * * * *